United States Patent
Katougi et al.

(10) Patent No.: US 9,149,880 B2
(45) Date of Patent: Oct. 6, 2015

(54) ELECTRICAL DISCHARGE MACHINE AND ELECTRICAL DISCHARGE MACHINING METHOD

(75) Inventors: Hidetaka Katougi, Tokyo (JP); Toshiyuki Kamiya, Tokyo (JP); Makoto Miyamoto, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 421 days.

(21) Appl. No.: 13/640,263

(22) PCT Filed: Apr. 21, 2010

(86) PCT No.: PCT/JP2010/057073
§ 371 (c)(1),
(2), (4) Date: Oct. 9, 2012

(87) PCT Pub. No.: WO2011/132276
PCT Pub. Date: Oct. 27, 2011

(65) Prior Publication Data
US 2013/0026140 A1     Jan. 31, 2013

(51) Int. Cl.
*B23K 9/00* (2006.01)
*B23H 1/10* (2006.01)
*B23H 3/02* (2006.01)

(52) U.S. Cl.
CPC ... *B23H 1/10* (2013.01); *B23H 3/02* (2013.01)

(58) Field of Classification Search
USPC .......... 219/69.11, 69.12, 69.13, 69.14, 69.17, 219/69.18, 70, 71
See application file for complete search history.

(56) References Cited

U.S. PATENT DOCUMENTS

| | | | |
|---|---|---|---|
| 4,491,714 A | 1/1985 | Inoue | |
| 4,575,603 A * | 3/1986 | Inoue et al. | 204/206 |
| 5,072,595 A * | 12/1991 | Barbier | 62/129 |
| 5,414,233 A * | 5/1995 | Fuller et al. | 219/69.17 |
| 6,344,624 B1 * | 2/2002 | Moro et al. | 219/69.12 |
| 8,540,942 B2 * | 9/2013 | Pierce et al. | 422/186 |
| 2002/0128743 A1 * | 9/2002 | Kurihara et al. | 700/162 |
| 2005/0189278 A1 * | 9/2005 | Iijima et al. | 210/192 |
| 2008/0100667 A1 * | 5/2008 | Uekita | 347/47 |
| 2010/0133237 A1 * | 6/2010 | Onodera et al. | 219/69.13 |
| 2013/0116703 A1 * | 5/2013 | Kosar | 606/128 |

FOREIGN PATENT DOCUMENTS

| | | |
|---|---|---|
| JP | 58-22628 A | 2/1983 |
| JP | 4-294926 A | 10/1992 |
| JP | 5-57527 A | 3/1993 |
| JP | 6-198516 A | 7/1994 |
| JP | 2000-160361 A | 6/2000 |
| JP | 2008-279533 A | 11/2008 |

* cited by examiner

*Primary Examiner* — Dana Ross
*Assistant Examiner* — Joseph Iskra
(74) *Attorney, Agent, or Firm* — Sughrue Mion, PLLC; Richard C. Turner (57) ABSTRACT

An electrical discharge machine that performs electrical discharge machining on a workpiece by supplying a machining fluid to a machining gap between a machining electrode and the workpiece, the electrical discharge machine including: an air-bubble generation unit that generates air bubbles in the machining fluid; a storage unit that stores therein the machining fluid containing the air bubbles generated by the air-bubble generation unit; and a flow-rate adjustment unit that adjusts a flow rate of the machining fluid that flows in the storage unit, wherein the flow-rate adjustment unit adjusts the flow rate according to a diameter of the air bubbles contained in the machining fluid to be supplied to a machining tank in which the workpiece is placed.

8 Claims, 5 Drawing Sheets

|  |  | INPUT QUANTITY OF AIR BUBBLES INSTEAD OF Si POWDER (AVERAGE PARTICLE DIAMETER OF 0.005 mm) | |
|---|---|---|---|
|  |  | CORRESPONDING TO CONCENTRATION OF 1g/l | CORRESPONDING TO CONCENTRATION OF 20g/l |
| AIR BUB-BLE DIAM-ETER [mm] | 0.0001 | $1.05 \times 10^{15}$ AIR BUBBLES/l | $2.10 \times 10^{16}$ AIR BUBBLES/l |
|  | 0.0005 | $8.39 \times 10^{12}$ AIR BUBBLES/l | $1.68 \times 10^{14}$ AIR BUBBLES/l |
|  | 0.0010 | $1.05 \times 10^{12}$ AIR BUBBLES/l | $2.10 \times 10^{13}$ AIR BUBBLES/l |
|  | 0.0050 | $8.39 \times 10^{9}$ AIR BUBBLES/l | $1.68 \times 10^{11}$ AIR BUBBLES/l |
|  | 0.0100 | $1.05 \times 10^{9}$ AIR BUBBLES/l | $2.10 \times 10^{10}$ AIR BUBBLES/l |
|  | 0.0500 | $8.39 \times 10^{6}$ AIR BUBBLES/l | $1.68 \times 10^{8}$ AIR BUBBLES/l |

FIG.3

| AIR BUBBLE DIAMETER [$\mu$m] | FLOW RATE [$\mu$m/s] | RISE VELOCITY [m/h] | REYNOLDS NUMBER Re |
|---|---|---|---|
| 100 | 5440 | 19.6 | 0.513 |
| 10 | 54.4 | 0.196 | $5.13 \times 10^{-4}$ |
| 1 | 0.544 | $1.96 \times 10^{-3}$ | $5.13 \times 10^{-7}$ |

|  | □50 DEPTH 2 mm Cu-St MACHINING | | | |
|---|---|---|---|---|
|  | WITHOUT MICROSCOPIC AIR BUBBLES | | WITH MICROSCOPIC AIR BUBBLES | |
|  | STANDARD CONDITIONS | AIR BUBBLE CONDITIONS | STANDARD CONDITIONS | AIR BUBBLE CONDITIONS |
| MACHINING TIME | 1:18:47 | 1:00:19 | 1:25:29 | 1:07:24 |
| ELECTRODE WEAR LENGTH | 0.009 mm | 0.018 mm | +0.001 mm | 0.000 mm |
| SURFACE ROUGHNESS Rz | 15.3 μm | 14.9 μm | 15.5 μm | 14.2 μm |
| REMARKS | SURFACE STAIN | SURFACE STAIN | NO PROBLEM | NO PROBLEM |

FIG.8

|  | 1 × 20 mm DEPTH 20 mm Cu-St MACHINING | | | |
|---|---|---|---|---|
|  | WITHOUT MICROSCOPIC AIR BUBBLES | | WITH MICROSCOPIC AIR BUBBLES | |
|  | STANDARD CONDITIONS | AIR BUBBLE CONDITIONS | STANDARD CONDITIONS | AIR BUBBLE CONDITIONS |
| MACHINING TIME | 3:28:24 | 3:19:44 | 3:21:21 | 3:26:22 |
| ELECTRODE WEAR LENGTH | 0.200 mm | 0.203 mm | 0.206 mm | 0.194 mm |
| SURFACE ROUGHNESS Rz | 8.5 μm | 9.0 μm | 8.5 μm | 8.9 μm |
| REMARKS | NO PROBLEM | NO PROBLEM | NO PROBLEM | NO PROBLEM |

FIG.9

|  | φ20 mm DEPTH 20 mm Cu-St MACHINING | | | |
|---|---|---|---|---|
|  | WITHOUT MICROSCOPIC AIR BUBBLES | | WITH MICROSCOPIC AIR BUBBLES | |
|  | STANDARD CONDITIONS | AIR BUBBLE CONDITIONS | STANDARD CONDITIONS | AIR BUBBLE CONDITIONS |
| MACHINING TIME | 9:45:21 | 9:07:01 | 9:16:32 | 8:45:31 |
| ELECTRODE WEAR LENGTH | 2.808g | 3.558g | 3.114g | 2.965g |
| SURFACE ROUGHNESS Rz | 8.9 μm | 7.8 μm | 7.7 μm | 8.2 μm |
| REMARKS | STAIN | STAIN | NO PROBLEM | NO PROBLEM |

ELECTRICAL DISCHARGE MACHINE AND ELECTRICAL DISCHARGE MACHINING METHOD

CROSS REFERENCE TO RELATED APPLICATIONS

This application is a National Stage of International Application No. PCT/JP2010/057073, filed on Apr. 21, 2010, the contents of all of which are incorporated herein by reference in their entirety.

FIELD

The present invention relates to an electrical discharge machine and an electrical discharge machining method.

BACKGROUND

Machining conditions, oscillating conditions, and the like of an electrical discharge machine are determined according to the shape of a tool electrode and electrical discharge energy during machining. For example, machining conditions corresponding to high energy are used for rough machining and those corresponding to low energy are used for finish machining. Under the low-energy machining conditions, a machining area is restricted due to problems of electrical discharge gap control and electrical discharge dispersibility, and it is commonly known that finish machining performance reduces as the machining area increases.

To solve these problems, a technique that enables to supply metal powder to a machining gap is proposed in Patent Literature 1, for example. The metal powder is supplied to the machining gap to disperse electrical discharge points, thereby improving machining stability and improving the reduction in the finish machining performance even if the machining area increases.

CITATION LIST

Patent Literature

Patent Literature 1: Japanese Patent Application Laid-open No. H6-198516
Patent Literature 2: Japanese Patent Application Laid-open No. H4-294926

SUMMARY

Technical Problem

An electrical discharge machining method using the metal powder has a problem of degradation in workability caused by use of the metal powder. For example, it is necessary to adopt dust prevention measures against fine metal powder. In post-machining cleaning, an operation for removing the metal powder remaining in or on an electrical discharge machine, a tool electrode, and a workpiece is required. Furthermore, because a machining-waste recovery device adversely recovers the metal powder as well as machining waste during machining, it is impossible to use the recovered metal powder. Input of the metal powder has an optimum value and accordingly it is necessary to perform concentration management of the metal powder. Other problems include a problem in that the metal powder is also discharged during the electrical discharge machining and a problem of the need to perform the life management of the metal powder.

In the finish machining, a controlled electrical discharge gap may be equal to or smaller than 0.01 millimeter. Entry of the metal powder having larger particle diameters than this electrical discharge gap has an adverse effect on the machining.

The conventional metal-powder mixture machining is adopted not only for the finish machining but also for the rough machining that uses relatively high energy because an electrical discharge dispersion effect can be attained. In some cases, the rough machining uses the metal powder having larger particle diameters than those of the metal powder for use in the finish machining. The high energy not only reduces the life of the metal powder because the metal powder itself is machined but also is accompanied by unrecovered large machining waste, which has an adverse effect on the machining.

To solve the problems, an electrical discharge machining method using air bubbles instead of the metal powder is proposed in Japanese Patent Application Laid-open No. H4-294926, for example. However, to practically improve the machining performance by the use of the air bubbles, it is necessary to stably supply large numbers of air bubbles to the machining gap. According to the conventional proposal, it may be difficult to attain desired machining performance because of the lack of clear reference to the diameters of the air bubbles and the supply quantity of the air bubbles.

The present invention has been achieved to solve the above problems, and an object of the present invention is to provide an electrical discharge machine and an electrical discharge machining method capable of performing electrical discharge machining with high machining performance by using air bubbles.

Solution to Problem

There is provided an electrical discharge machine according to an aspect of the present invention that performs electrical discharge machining on a workpiece by supplying a machining fluid to a machining gap between a machining electrode and the workpiece, the electrical discharge machine including: an air-bubble generation unit that generates air bubbles in the machining fluid; a storage unit that stores therein the machining fluid containing the air bubbles generated by the air-bubble generation unit; and a flow-rate adjustment unit that adjusts a flow rate of the machining fluid that flows in the storage unit, wherein the flow-rate adjustment unit adjusts the flow rate according to a diameter of the air bubbles contained in the machining fluid to be supplied to a machining tank in which the workpiece is placed.

Advantageous Effects of Invention

The electrical discharge machine and the electrical discharge machining method according to the present invention enable electrical discharge machining with high machining performance by using air bubbles.

DESCRIPTION OF EMBODIMENTS

Exemplary embodiments of an electrical discharge machine and an electrical discharge machining method according to the present invention will be explained below in detail with reference to the accompanying drawings. The present invention is not limited to the embodiments.

Embodiment

Figure 1:
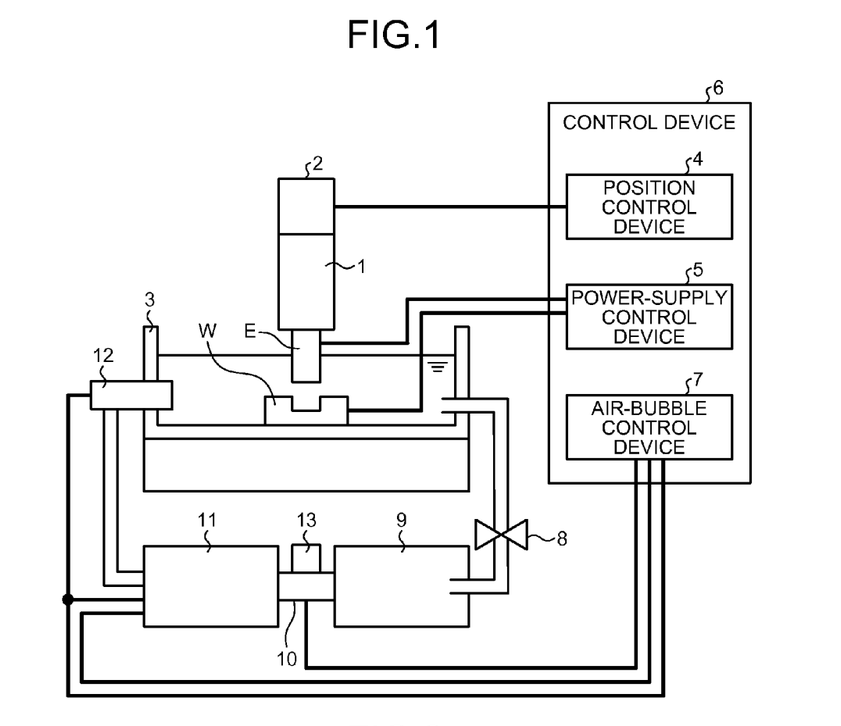
FIG. 1 is a schematic configuration diagram of an electrical discharge machine according to an embodiment of the present invention.

FIG. 1 is a schematic configuration diagram of an electrical discharge machine according to an embodiment of the present invention. The electrical discharge machine according to the present embodiment is, for example, a die-sinking electrical discharge machine that machines a workpiece W by arranging, for example, a tool electrode (machining electrode) E and the workpiece W face to face. The electrical discharge machine machines the workpiece W by producing discharge between the tool electrode E and the workpiece W while moving the tool electrode E and the workpiece W relatively to each other. It suffices that the electrical discharge machine according to the present invention performs electrical discharge machining using shape information and machining conditions obtained by a shape calculation device. A wire electrical discharge machine using a wire as the tool electrode E or a fine hole electrical discharge machine using a rod electrode or a hollow rod electrode as the tool electrode E can be used as the electrical discharge machine.

The electrical discharge machine performs electrical discharge machining on the workpiece W by supplying a machining fluid to a machining gap between the tool electrode E held by a main shaft 1 and the workpiece W arranged in a machining tank 3. A driving device 2 drives the main shaft 1 according to control by a position control device 4. The machining tank 3 is not necessarily filled with the machining fluid.

A control device 6 includes the position control device 4, a power-supply control device 5, and an air-bubble control device 7. The position control device 4 controls a position of the main shaft 1 with respect to a horizontal direction (XY direction), a perpendicular direction (Z direction), a rotational direction (C direction) and the like. Power-supply lines are arranged between the tool electrode E and the power-supply control device 5 and between the workpiece W and the power-supply control device 5, respectively. The power-supply control device 5 causes an electrical discharge phenomenon between the tool electrode E and the workpiece W by applying a voltage. The control device 6 includes an interface for setting electrical discharge machining conditions and air bubble-related conditions.

A machining fluid tank 9 has the machining fluid stored therein, which is drained from the machining tank 3 by opening a machining-fluid drain valve 8. An air-bubble generation device 10 functions as an air-bubble generation unit that generates air bubbles within the machining fluid. A gas supply device 13 takes in the air and supplies the air to the air-bubble generation device 10. As the air-bubble generation device 10, a diffuser or a spiral flow bubbler is used, for example. An air-bubble storage device 11 functions as a storage unit that has the machining fluid that contains the air bubbles generated by the air-bubble generation device 10 stored therein. The air-bubble storage device 11 is formed into a cuboid, for example. A machining-fluid supply port 12 supplies the machining fluid from the air-bubble storage device 11 to the machining tank 3.

The air bubbles used in the electrical discharge machining according to the present embodiment are so-called micro bubbles or nano bubbles having diameters of, for example, a few micrometers or less similarly to the metal powder used in the conventional powder-mixture electrical discharge machining. Fine air bubbles are mixed into the machining fluid by causing the machining fluid introduced into the air-bubble generation device 10 to catch the gas by a negative pressure effect when the machining fluid passes through the air-bubble generation device 10.

Figure 2:
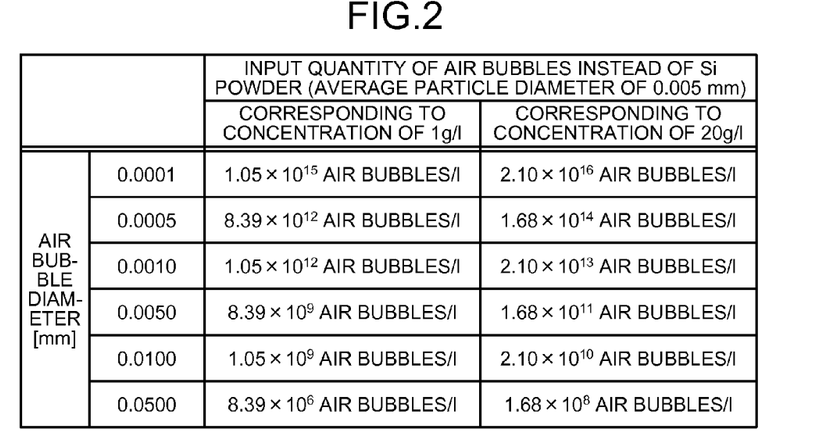
FIG. 2 is a table of a relation between quantities of air bubbles input into a machining fluid instead of powder used in powder mixture machining and diameters of the air bubbles.

FIG. 2 is a table of an example of a relation between quantities of the air bubbles input into the machining fluid instead of the powder used in the powder mixture machining and diameters of the air bubbles. The table of FIG. 2 depicts approximate quantities of the air bubbles to be input to correspond to cases where concentrations of silicon (Si) powder with an average particle diameter of about 0.005 millimeter are 1 g/l and 20 g/l, respectively. This table indicates that it is required to input the air bubbles in a large quantity of about from $10^6$ to $10^{16}$ per liter.

Figure 3:
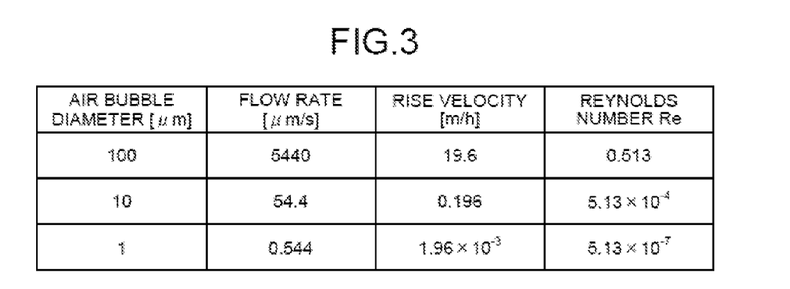
FIG. 3 is a table of a relation among diameters of the air bubbles, rise velocities thereof, and the Reynolds numbers according to Stokes Equations.

FIG. 3 is a table of a relation among diameters of the air bubbles, rise velocities thereof, and the Reynolds numbers according to the Stokes Equations. The table of FIG. 3 is an example of the air bubbles in water at 20° C. The air bubbles rise by a buoyant force and disappear on a fluid surface. To suppress the rising air bubbles from disappearing, the air-bubble storage device 11 causes the machining fluid to constantly flow at a flow rate adjusted according to the diameters of the air bubbles. The air bubbles generated by the air-bubble generation device 10 are stored in the air-bubble storage device 11 while supply of the air bubbles is to be stopped or while the air bubbles as well as the machining fluid are to be supplied to the machining gap. It is thereby possible to supply the machining fluid containing a large quantity of air bubbles.

Figure 4:
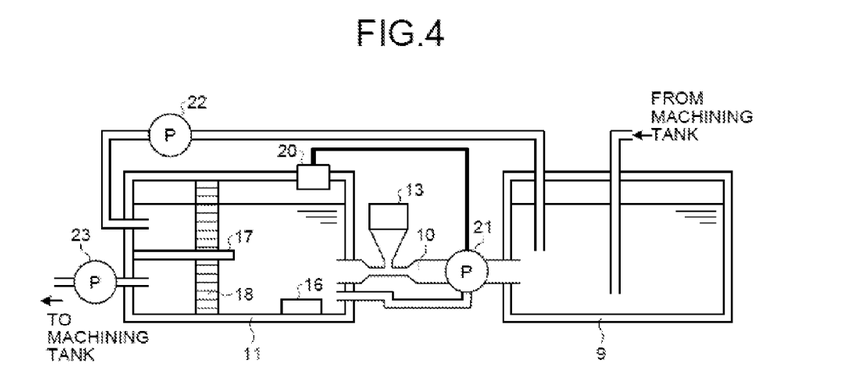
FIG. 4 depicts a machining fluid tank, an air-bubble generation device, an air-bubble storage device, and a gas supply device, and peripheral elements thereof.

FIG. 4 depicts the machining fluid tank, the air-bubble generation device, the air-bubble storage device, and the gas supply device, and peripheral elements thereof. In FIG. 4, it is assumed that the machining fluid basically flows from right to left. A pump 21 and the air-bubble generation device 10 are provided between the machining fluid tank 9 and the air-bubble storage device 11.

The pump 21 functions as an air-bubble-generation machining-fluid supply unit that supplies the machining fluid from the machining fluid tank 9 to the air-bubble generation device 10. The machining fluid supplied to the air-bubble generation device 10 by actuation of the pump 21 is mixed with the air bubbles in the air-bubble generation device 10, and a mixture of the machining fluid and the air bubbles is supplied to the air-bubble storage device 11. The pump 21 can switch a machining-fluid running route between a channel for supplying the machining fluid to the air-bubble generation device 10 and a channel for supplying the machining fluid directly to the air-bubble storage device 11 without passing through the air-bubble generation device 10.

The pump 21 is controlled by the air-bubble control device 7 (see FIG. 1). When the air-bubble control device 7 transmits a signal indicating stop to generate the air bubbles to a pump 22, the pump 22 supplies the machining fluid directly to the air-bubble storage device 11 from the machining fluid tank 9. When the air-bubble control device 7 transmits a signal indicating generation of the air bubbles to the pump 21, the pump 21 supplies the machining fluid from the machining fluid tank 9 to the air-bubble generation device 10. The air-bubble generation device 10 mixes the gas from the gas supply device 13 into the machining fluid, and generates air-bubble-mixed machining fluid in which the diameters of the air bubbles are not uniform.

An air-bubble quantity sensor 20 functions as an air-bubble-quantity detection unit that detects the quantity of the air bubbles contained in the machining fluid stored in the air-bubble storage device 11. The machining fluid changes from a transparent state to a clouded state by being mixed with the air bubbles. For example, a reflection optical sensor is used as the air-bubble quantity sensor 20, to detect the quantity of the air bubbles on the basis of a degree of cloudiness of the machining fluid.

The air-bubble quantity sensor 20 determines whether the air bubbles mixed into the machining fluid are excessive or deficient so that the quantity of the air bubbles is set to be equal to a specified quantity, for example, shown in FIG. 2. When detecting that the air bubbles are excessive, the air-bubble quantity sensor 20 transmits a signal indicating stop to generate the air bubbles to the air-bubble control device 7. When detecting that the air bubbles are deficient, the air-bubble quantity sensor 20 transmits a signal indicating generation of the air bubbles to the air-bubble control device 7. The pump 21 is controlled to supply or stop supplying the machining fluid to the air-bubble generation device 10 according to a result of detection by the air-bubble quantity sensor 20. The quantity of the air bubbles mixed into the machining fluid stored in the air-bubble storage device 11 is thereby adjusted. The control device 6 can display an excessive or deficient state of the air bubbles according to the result of the detection by the air-bubble quantity sensor 20.

The air-bubble control device 7 controls driving of a partition-plate moving device 18 according to the set diameter of the air bubbles. An air-bubble-diameter discrimination partition plate 17 moves up and down upon driving of the partition-plate moving device 18. The air-bubble-diameter discrimination partition plate 17 functions as an air-bubble-diameter selection unit that selects the diameter of the air bubbles to be contained in the machining fluid discharged from the air-bubble storage device 11 by partitioning the air-bubble storage device 11 in a depth direction. The partition-plate moving device 18 adjusts a position of the air-bubble-diameter discrimination partition plate 17 in the depth direction according to the selected diameter of the air bubbles.

A machining-fluid circulation device 16 functions as a flow-rate adjustment unit that adjusts the flow rate of the machining fluid that flows in the air-bubble storage device 11. The machining-fluid circulation device 16 adjusts the flow rate at which the machining fluid circulates in the air-bubble storage device 11 according to the diameter of the air bubbles contained in the machining fluid to be supplied to the machining tank 3. A pump 23 supplies the machining fluid in a lower portion than the air-bubble-diameter discrimination partition plate 17 of the air-bubble storage device 11 to the machining tank 3. The pump 22 returns the machining fluid in an upper portion than the air-bubble-diameter discrimination partition plate 17 of the air-bubble storage device 11 to the machining fluid tank 9.

The air bubbles mixed into the machining fluid are separated into those that float upward in the machining fluid and those that flow together with the machining fluid according to the flow rate of the machining fluid base on the relations of the Stoke Equations. The machining-fluid circulation device 16 controls the flow rate of the machining fluid in the air-bubble storage device 11 according to a desired diameter of the air bubbles.

For example, when the diameter of the air bubbles is set to 10 micrometers, the flow rate of the machining fluid is set to 54.4 µm/sec based on the relation shown in FIG. 3. Among the air bubbles that are generated by the air-bubble generation device 10, the air bubbles having diameters larger than 10 micrometers float upward before reaching the air-bubble-diameter discrimination partition plate 17 and disappear on the fluid surface. The air bubbles having diameters equal to or smaller than 10 micrometers do not float upward while the machining fluid flows, flow together with the machining fluid, and remain without disappearing.

An outlet port for discharging the machining fluid from the air-bubble storage device 11 to the machining tank 3 is provided on a bottom or near the bottom of the air-bubble storage device 11. The air bubbles may be coupled together to thereby generate larger air bubbles. By configuring the air-bubble storage device 11 to discharge the machining fluid from the bottom or near the bottom of the air-bubble storage device 11, it is possible to suppress larger air bubbles from being discharged from the air-bubble storage device 11.

The machining fluid discharged from the outlet port of the air-bubble storage device 11 is supplied from the machining-fluid supply port 12 to the machining tank 3 and used for machining. A nozzle, a pot-like container, or the like can be arranged on an end of the machining-fluid supply port 12 depending on details of the machining, or the machining fluid can be directly supplied from the machining-fluid supply port 12 to the machining tank 3. When a device that causes the machining fluid to flow is provided in the machining tank 3, the machining fluid can be caused to flow at the flow rate suitable for the diameter of the air bubbles also in the machining tank 3 according to information set in the air-bubble control device 7. This enables the air bubbles with the desired diameter to remain for long time also in the machining tank 3.

The electrical discharge machine according to the present embodiment can stably and sufficiently supply the air bubbles having the desired diameter to the machining gap and can perform electrical discharge machining with high machining performance.

Figure 5:
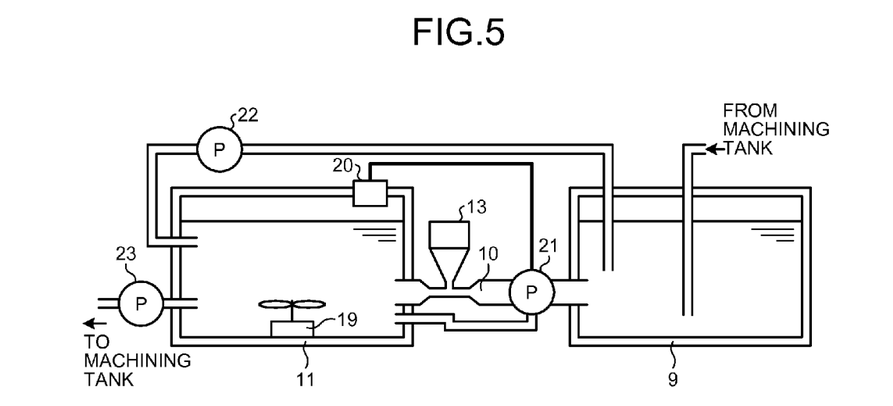
FIG. 5 depicts a modification of the present embodiment.
Figure 6:
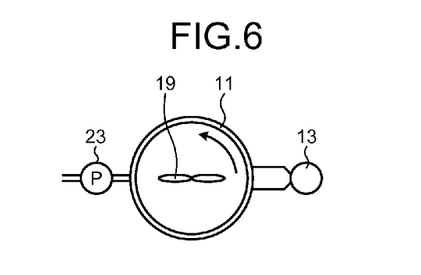
FIG. 6 is a schematic top view of an air-bubble storage device and peripheral elements thereof among elements shown in FIG. 5.

FIG. 5 depicts a modification of the present embodiment. FIG. 6 is a schematic top view of an air-bubble storage device and peripheral elements thereof among elements shown in FIG. 5. The air-bubble storage device 11 has a cylindrical shape. A rotary machining-fluid circulation device 19 functions as a flow-rate adjustment unit that adjusts the flow rate of the machining fluid that flows in the air-bubble storage device 11. The rotary machining-fluid circulation device 19 selects the diameter of the air bubbles contained in the machining fluid to be discharged from the air-bubble storage device 11 by adjusting a flow rate at which the machining fluid circles in the air-bubble storage device 11.

The machining fluid creates a vortex flow in the air-bubble storage device 11 by actuation of the rotary machining-fluid circulation device 19. The air bubbles mixed into the machining fluid are separated into those that float upward in the machining fluid and those that flow together with the machining fluid according to the flow rate of the machining fluid based on the relations of the Stokes Equations. The rotary machining-fluid circulation device 19 controls the flow rate of the machining fluid stored in the air-bubble storage device 11 according to the desired diameter of the air bubbles.

For example, when the diameter of the air bubbles is set to 10 micrometers, the flow rate of the machining fluid is set to 54.4 μm/sec based on the relation shown in FIG. 3. Among the air bubbles that are generated by the air-bubble generation device 10, the air bubbles having the diameters larger than 10 micrometers float upward and disappear on the fluid surface at locations where the machining fluid flows at a flow rate equal to or lower than 54.4 μm/sec. The air bubbles having the diameters equal to or smaller than 10 micrometers do not float upward while the machining fluid flows, flow together with the machining fluid, and remain without disappearing. In the present modification, similarly to the above embodiment, to suppress larger air bubbles from being discharged from the air-bubble storage device 11, the outlet port for discharging the machining fluid from the air-bubble storage device 11 to the machining tank 3 is provided on the bottom or near the bottom of the air-bubble storage device 11. The pump 22 returns the machining fluid in an upper portion of the air-bubble storage device 11 to the machining fluid tank 9.

In the present modification, similarly to the above embodiment, it is possible to stably and sufficiently supply the air bubbles with the desired diameter to the machining gap and to perform the electrical discharge machining with the high machining performance.

Figure 7:
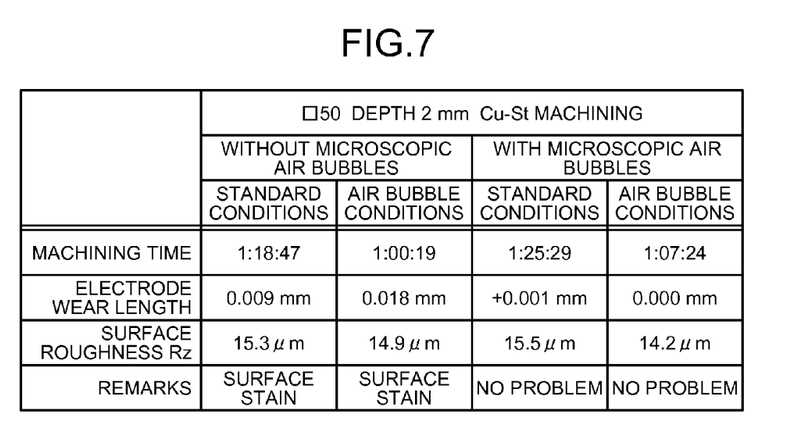
FIG. 7 is a table of machining results in an example of applying the electrical discharge machine according to the present invention to rough machining performed on a workpiece having a flat shape.
Figure 8:
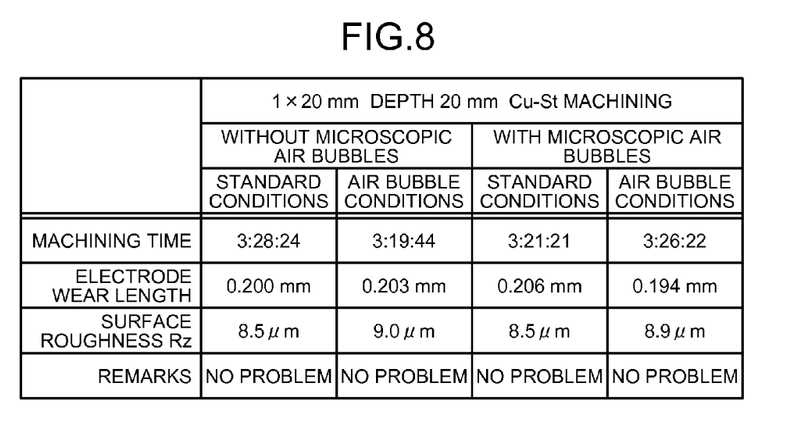
FIG. 8 is a table of machining results in an example of applying the electrical discharge machine according to the present invention to rib machining.
Figure 9:
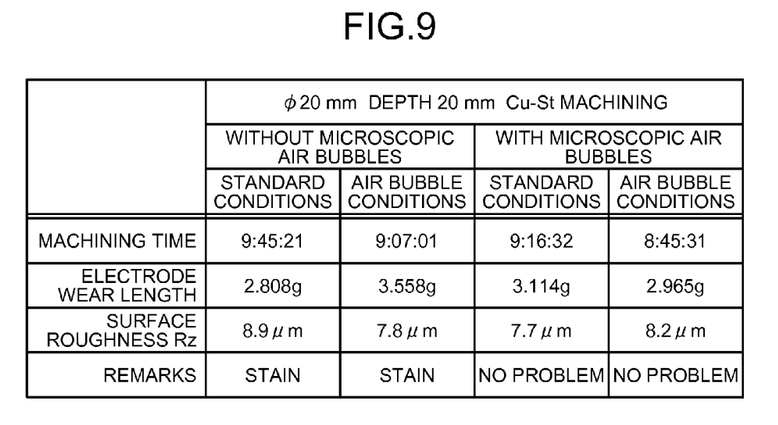
FIG. 9 is a table of machining results in an example of applying the electrical discharge machine according to the present invention to drilling machining.

FIG. 7 is a table of machining results in an example of applying the electrical discharge machine according to the present invention to rough machining performed on the workpiece W having a flat shape. FIG. 8 is a table of machining results in an example of applying the electrical discharge machine according to the present invention to rib machining. FIG. 9 is a table of machining results in an example of applying the electrical discharge machine according to the present invention to drilling machining.

In each of the examples, a case where the fine air bubbles explained in the present embodiment are not mixed is compared with a case where the fine air bubbles are mixed. Furthermore, each example represents machining results under standard conditions and those under air bubble conditions. The standard conditions are basic machining conditions included in a database of the electrical discharge machine. The air bubble conditions are machining conditions when a jump setting is adjusted to facilitate introducing the fine air bubbles to the machining gap. As the machining results, machining time, an electrode wear length, a surface roughness (Rz), and a machined surface quality as remarks are shown.

In the flat-shape rough machining shown in FIG. 7, it is possible to reduce wear of the electrode and to improve the machined surface quality by using the fine air bubbles. The rib machining shown in FIG. 8 means deep groove machining by means of a sheet electrode. In a case of the rib machining, it is difficult to sufficiently supply the fine air bubbles to the machining gap and noticeable effects are not obtained.

The results of the drilling machining shown in FIG. 9 are obtained by performing machining by drilling a pilot hole with a diameter of 10 millimeters in advance and supplying the fine air bubbles to the pilot hole. In the drilling machining, it is possible to reduce the machining time and to improve the machined surface quality by using the fine air bubbles.

The electrical discharge machine and the electrical discharge machining method according to the present invention can facilitate the dispersion of electrical discharge points by adopting the fine air bubbles instead of the metal powder used for the powder-mixture electrical discharge machining, and can perform stable machining similarly to the case of using the metal powder. Furthermore, it is possible to considerably improve the workability by using the air bubbles instead of the metal powder because the air bubbles are easier to handle than the metal powder in such respects as no need of dust prevention measures or post-machining cleaning.

INDUSTRIAL APPLICABILITY

As described above, the electrical discharge machine and the electrical discharge machining method according to the present invention are useful in a feature of being capable of performing machining with machining performance equivalent to that of electrical discharge machining using metal powder.

REFERENCE SIGNS LIST

1 MAIN SHAFT
2 DRIVING DEVICE
3 MACHINING TANK
4 POSITION CONTROL DEVICE
5 POWER-SUPPLY CONTROL DEVICE
6 CONTROL DEVICE
7 AIR-BUBBLE CONTROL DEVICE
8 MACHINING-FLUID DRAIN VALVE
9 MACHINING FLUID TANK
10 AIR-BUBBLE GENERATION DEVICE
11 AIR-BUBBLE STORAGE DEVICE
12 MACHINING-FLUID SUPPLY PORT
13 GAS SUPPLY DEVICE
16 MACHINING-FLUID CIRCULATION DEVICE
17 AIR-BUBBLE-DIAMETER DISCRIMINATION PARTITION PLATE
18 PARTITION-PLATE MOVING DEVICE
19 ROTARY MACHINING-FLUID CIRCULATION DEVICE
20 AIR-BUBBLE QUANTITY SENSOR
21, 22, 23 PUMP
E TOOL ELECTRODE
W WORKPIECE

The invention claimed is:

1. An electrical discharge machine that performs electrical discharge machining on a workpiece by supplying a machining fluid to a machining gap between a machining electrode and the workpiece, the electrical discharge machine comprising:
    an air-bubble generation unit that generates air bubbles in the machining fluid;
    a storage unit that stores therein the machining fluid containing the air bubbles generated by the air-bubble generation unit; and
    a flow-rate adjustment unit that adjusts a flow rate of the machining fluid that flows in the storage unit, wherein
    the flow-rate adjustment unit adjusts the flow rate according to a diameter of the air bubbles, which is contained in the machining fluid to be supplied to a machining tank in which the workpiece is placed, such that the air bubbles are suppressed to rise in the machining fluid.

2. The electrical discharge machine according to claim 1, comprising an air-bubble-diameter selection unit that selects a diameter of the air bubbles contained in the machining fluid to be discharged from the storage unit by partitioning the storage unit in a depth direction, wherein
   a position of the air-bubble-diameter selection unit is configured to be adjusted in the depth direction according to the selected diameter of the air bubbles.

3. The electrical discharge machine according to claim 1, wherein the flow-rate adjustment unit selects a diameter of the air bubbles contained in the machining fluid to be discharged from the storage unit by adjusting a flow rate at which the machining fluid circulates in the storage unit.

4. The electrical discharge machine according to claim 1, comprising:
   an air-bubble-generation machining-fluid supply unit that supplies the machining fluid to the air-bubble generation unit; and
   an air-bubble-quantity detection unit that detects a quantity of the air bubbles contained in the machining fluid stored in the storage unit, wherein
   the air-bubble-generation machining-fluid supply unit is controlled to supply or to stop supplying the machining fluid to the air-bubble generation unit based on a result of detection by the air-bubble-quantity detection unit.

5. The electrical discharge machine according to claim 1, wherein an outlet port for discharging the machining fluid from the storage unit to the machining tank is provided on a bottom of the storage unit or near the bottom of the storage unit.

6. An electrical discharge machining method for performing electrical discharge machining on a workpiece by supplying a machining fluid to a machining gap between a machining electrode and the workpiece, the electrical discharge machining method comprising:
   an air-bubble generating step of generating air bubbles in the machining fluid;
   a storing step of storing the machining fluid containing the air bubbles generated at the air-bubble generating step; and
   a flow-rate adjusting step of adjusting a flow rate at which the machining fluid stored at the storing step flows, wherein
   at the flow-rate adjusting step, the flow rate is adjusted according to a diameter of the air bubbles contained in the machining fluid to be supplied to a machining tank in which the workpiece is placed.

7. The electrical discharge machine according to claim 1, wherein diameters of the air bubbles generated by the air-bubble generation unit are not uniform.

8. The electrical discharge machine according to claim 1, further comprising an air-bubble-diameter selection unit that selects a diameter of the air bubbles contained in the machining fluid to be discharged from the storage unit.

* * * * *